United States Patent [19]
Quinn

[11] 3,881,678
[45] May 6, 1975

[54] ATTACHING APPARATUS
[75] Inventor: Peter T. Quinn, Littleton, Colo.
[73] Assignee: Honeywell, Inc., Minneapolis, Minn.
[22] Filed: June 28, 1973
[21] Appl. No.: 374,572

[52] U.S. Cl. ............... 248/360; 248/231; 354/126
[51] Int. Cl. ................................... A47g 29/122
[58] Field of Search .................. 95/86; 240/2 C, 13; 248/231, 74 B, 359, 360; 242/100.1, 107.1, 107.12; 354/126, 288, 354

[56] References Cited
UNITED STATES PATENTS

| 508,822 | 11/1893 | Evory | 248/74 B X |
|---|---|---|---|
| 1,246,833 | 11/1917 | Alexander | 242/100.1 |
| 2,479,716 | 8/1949 | Bensen | 95/86 X |
| 2,897,928 | 8/1959 | Selig | 240/2 C X |
| 2,949,838 | 8/1960 | Skalabrin | 240/1.3 |
| 2,956,758 | 11/1960 | Pleiss | 242/100.1 |
| 3,244,392 | 4/1966 | Sheets | 248/231 |
| 3,526,056 | 9/1970 | Stropkay | 248/231 X |
| 3,751,652 | 8/1973 | Peterson | 240/1.3 |

Primary Examiner—Samuel S. Matthews
Assistant Examiner—E. M. O'Connor
Attorney, Agent, or Firm—Arthur H. Swanson; Lockwood D. Burton; John Shaw Stevenson

[57] ABSTRACT

An improved attachment element includes a housing, and an elastic band which may be extended from a suitable opening in the housing to embrace a member to which the housing is to be attached. The elastic band may then be retracted into the housing to tighten the band about the member for firm attachment of the housing to the member. The element also features rotatably mounted devices on two opposite faces of the housing to accommodate the attachment of additional members to the housing.

1 Claim, 4 Drawing Figures

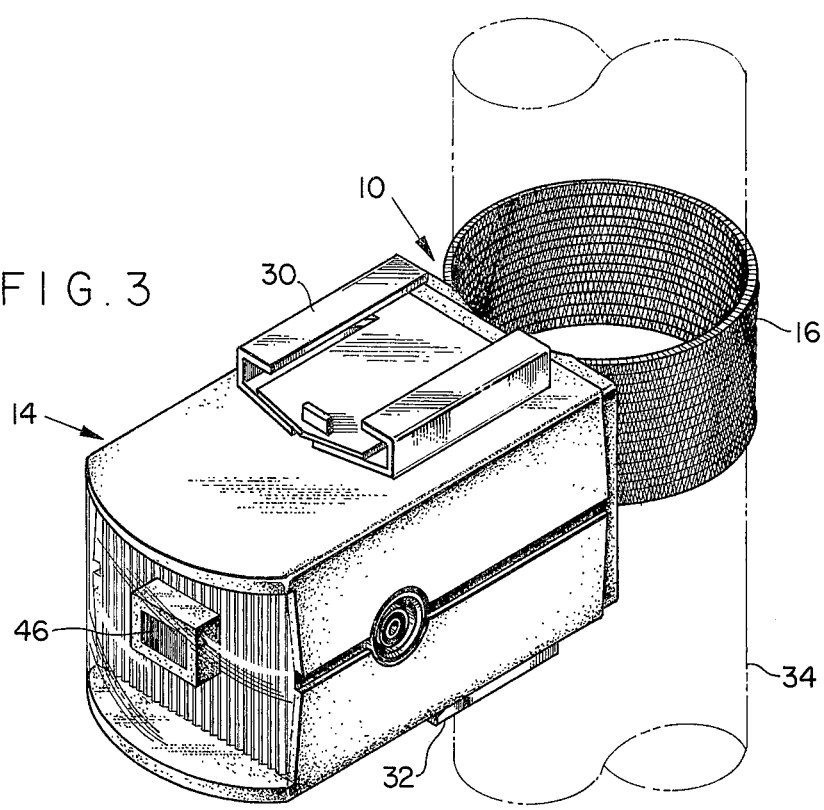
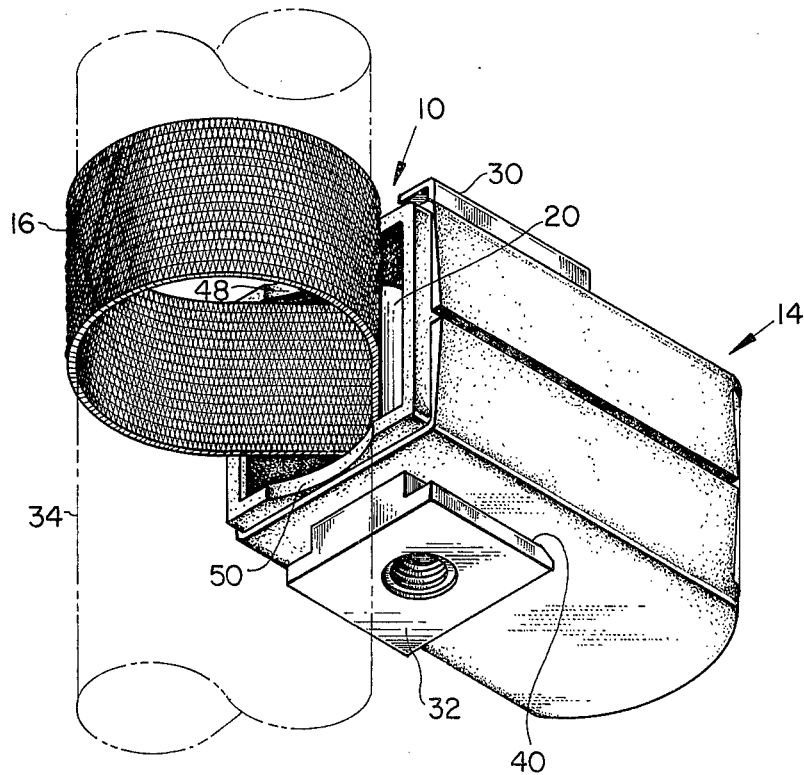

ATTACHING APPARATUS

BACKGROUND OF THE INVENTION

1. Field of the Invention

The invention relates to an improved attachment element of the type generally classified in the U.S. Patent Office with flexible clamping band support (under class 248-231).

2. Description of the Prior Art

There have been many different types of devices used with brackets, casing and other similar devices to attach them to members such as posts and the like. One example of a prior art adjustable clamping band support bracket attachment that is used for this purpose is shown in the John F. Gill U.S. Pat. No. 3,402,908.

The attachment disclosed in the aforementioned patent employs a chain element fixed at one end to an angle iron and to an adjustable screw connection that is associated with another part of the angle iron at its other end for adjusting the active length of the chain. The angle iron and chain is fixedly connected to a tubular shaped support member by placing the member within the confines of the angle iron and chain and reducing the active length of the chain about the member and adjusting the screw connection.

Another example of a prior art device that is used to attach a supporting member is shown in the Oishei et al. U.S. Pat. No. 1,978,646. The Oishei patent provides a windlass in a hollow body and a flexible member anchored at one end to the windlass so the flexible member can be wound on or off the windlass. The flexible member is positioned about a spare tire and its free end is connected to a part of the hollow body. When the windlass is rotated in one direction the flexible member will bring the tire, about which it is partially wrapped, into a detachably secured position against the hollow body.

SUMMARY OF THE INVENTION

In accordance with the present invention there is provided an improved attaching element for rapidly connecting a casing in snug supporting engagement with any one of a number of support members such as a post, a handle or the like, that have differing cross sectional areas. The attaching element consists of a resilient band having a loop portion thereof connected to a drum that is positioned in the casing and a remaining portion that is spirally wound about the drum.

Initial rotation of the drum causes the free loop portion of the resilient band to be extended through an opening in the housing to a position where it can be loosely positioned about the member to which the casing is to be attached. Subsequent rotation of the drum will then cause the elastic band to be rewound about the drum and retracted into the housing. As this retraction of the elastic band into the housing takes place, the band is tightened about the support member and the casing will be simultaneously brought into intimate contact with the support member.

The ends of the drum protrude through opposite ends of the casing and have gripping devices mounted thereon for manually rotating the drum and for providing a means by which other devices, such as photographic accessories, can be mounted in different angular positions on the top or bottom of the housing.

BRIEF DESCRIPTION OF THE DRAWINGS

A better understanding of the present invention may be had when the following detailed description is read in connection with the accompanying drawings in which:

FIG. 3 is a front perspective view of the attachment element shown in FIG. 1; and FIG. 4 is a rear perspective view of the attachment element shown in FIG. 1.

DESCRIPTION OF THE PREFERRED EMBODIMENT

For an understanding of the preferred embodiment of the invention, reference will first be made to FIG. 1 and FIG. 2.

The attachment element 10 is comprised of a part 12 of a housing 14. The attachment element 10 is also comprised of a resilient band 16 made of any resilient material such as rubber, a plastic material or a mixture of different resilient material such as those employed in elastic garters and elastic belts.

Figure 1:
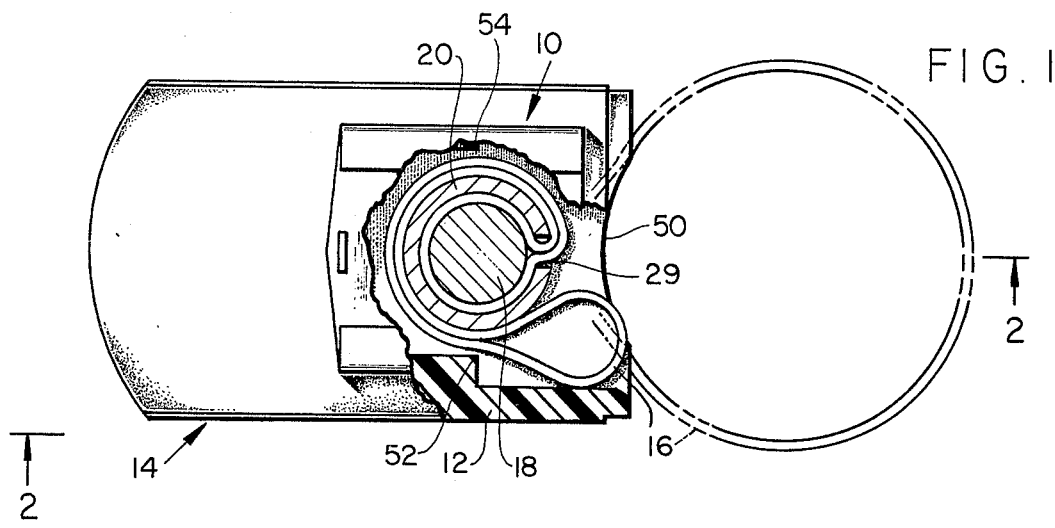
FIG. 1 shows a plan view of the attachment element with a part thereof broken away showing an embodiment of the present invention.

FIG. 1 illustrates in solid line form how the elastic band can be stored within the housing and further shows in phantom line form how this band is used to attach the housing to a support member.

One portion of the band 16 is positioned about the outer periphery of a shaft 18 and adjacent the inner wall of a sleeve 20. The sleeve 20 is connected by means of tightened screw connection 19 located at its lower end for rotatable movement as a single unit with the shaft 18. The shaft 18 and sleeve 20 thus form a drum that is mounted for rotation in the housing 14. The sleeve 20 is mounted through openings 22 and 24 in the top and bottom walls 26, 28 of the casing 14.

Another portion of the resilient band 16 passes through a vertical slot 29, formed in the sleeve 20 and is wound in a stored position about the outer wall surface of the sleeve 20. The outer end loop portion of the resilient band 16 is retained while in a stored position adjacent an open, concave right end wall of this casing 12 as shown in solid line form in FIG. 1.

Figure 2:
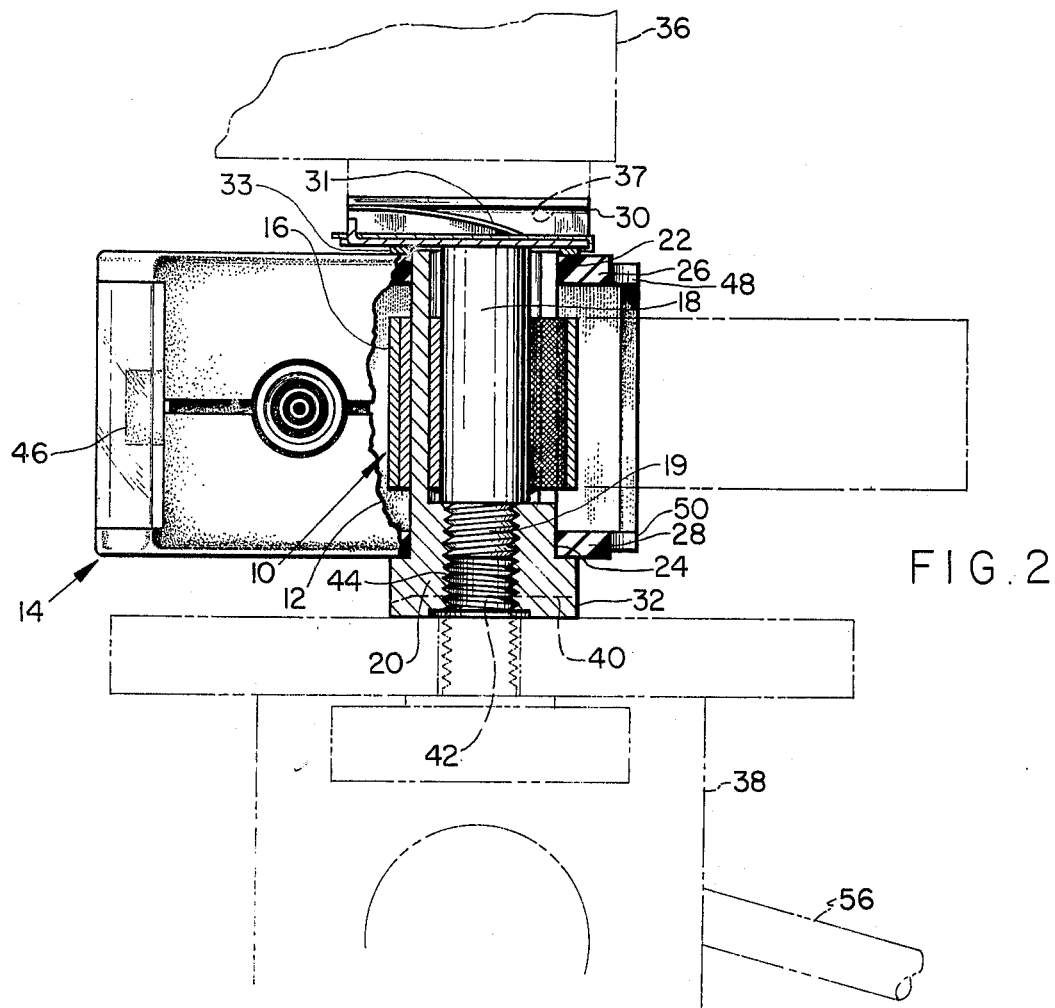
FIG. 2 is a vertical section taken along the lines 2—2 of FIG. 1.

The upper end of the shaft 18, as is best shown in FIG. 2, has an attaching device, for example, a shoe receptacle 30, containing a leaf spring 31. The shoe provides means for manually gripping and rotating the shaft 18.

The lower end of the sleeve 20 has another attaching device, for example, a foot 32 connected thereto for providing an additional manual gripping and rotating means for the shaft 18, as is best shown in FIGS. 2 and 4.

A friction introducing spring washer 33 is positioned between the bottom surface of gripping means 30 and an associated outer surface of the housing 14.

FIGS. 3 and 4 of the drawing illustrates one of the many ways in which the preferred embodiment of the invention can be utilized. This illustration shows, by way of an example, the housing 14 as being the housing of a photographic flash light triggering unit mounted by means of the band 16 on a handle 34 of a slave photographic flash light unit. The triggering unit in the housing is of a well known type such as is disclosed in pages 299, 300 of the General Electric SCR Manual, fourth edition. It should be noted that the housing 14 can be any one of many other types of housings that are used for different purposes than the one to which reference is made. Furthermore, the present invention can be employed to attach any of these housings to a post or any other type of member desired instead of attaching these casings to the aforementioned handle 34.

The length selected for the band 16 will depend on the cross section area of the member 34 to which the housing is to be attached. In other words, the length of the band is made long enough to allow it to be extended through the opening in the housing and easily positioned, while in a loose condition, about the member 34.

Another feature of the preferred embodiment of the invention is that the manually operated rotatable gripping device or shoe 30 can, by way of illustration in FIG. 2 of the drawing, be used to accommodate the mounting of a photographic flash light unit 36 or any other similar unit thereon that contains a mounting foot 37 such as is best shown in FIG. 2.

Still another alternative feature of the preferred embodiment of the invention is that, since the manually operated rotatable gripping device 32 has a threaded screw connection 42, the device 32 of the improved attachment element 10 can therefore be connected to a tripod 38 as shown in FIG. 2.

MODE OF OPERATION

When it is desired to employ the aforementioned attachment element 10 for mounting the casing 14 on any one of a number of different size posts, handles, or other members, the gripping device 30 and/or 32 is manually engaged and rotated in one direction. As this rotation of the gripping device 30 and/or 32 occurs, drum parts 18, 20 attached hereto will also be rotated with the devices 30 and 32 as a unit in the same direction from the solid line position of the band 16 shown in FIG. 1. This rotation allows the loop end of the resilient band 16 to be moved off the drum 20 and out of the housing 14 to a position in which it extends through the slot 29 toward the dotted line position as shown in FIG. 1. The extended end of the loop 16 is then placed in a loose condition over a stationary support, e.g., a post, a handle or other member 34 to which the casing 14 is to be attached.

The unit 14 is then moved longitudinally to a desired position on the post, handle or other member 34. It may be desirable e.g., to attach the casing 14 to the member 34 so a light sensor 46 of a photographic flash light trigger unit that is built into the opposite end of the casing 34 can be fixed at a desired height.

When the unit 14 has been aligned in the aforementioned manner the gripping means 30 and/or 32 is then manually rotated in a suitable direction to bring the concave end 48, 50 of the casing 14 into tight surface to surface contact with the post or handle 34 by the pulling action of the resilient band 16 that is then in a tight wrapped position about the member 34.

Thereafter, when it is desired to remove the resilient band 16 from the member 34 the gripping means 30, 32 and drum 18, 20 is rotated in a reverse direction to that previously mentioned. This will allow the band 16 to be returned to a loose condition about the member 34. The band 16 can then be removed from the membrane 34 and additional rotation applied to the drum 18, 20 by means of the rotatable means 30 or 32 so the band 16 can be returned to its stored position within the casing as shown in solid line form in FIG. 1.

FIG. 1 also shows a shoulder 52 and a shoulder 54 formed as a part of the inner wall of the housing 14 to guide overlapping opposite side portions of the resilient band 16 toward and away from the outer surface of the sleeve portion 20 of the drum 18, 20 while the aforementioned described winding and unwinding of the band 16 occurs.

When the outer loop of the band 16 is wound in the opposite direction about the drum 20 from that shown in FIG. 1, the band 16 can then be unwound in a clockwise direction from about the outer surface of the sleeve portion 20 of the drum 18, 20 or in other words, in an opposite direction to that previously described. The band 16 can thus be moved to a position for attachment to a post, a handle, or other member 34 by rotating the gripping means 30 in either direction.

When the gripping device 32 for rotating the drum 18, 20 is made in the form of the foot 32, as shown in FIG. 4, the surface 40 of this foot 32 can be slid into a mounting position with a shoe receptacle located at the top of any supporting device which contains a shoe receptacle, such as the top of a camera.

FIG. 2 shows a conventional screw threaded connection, 42 which per se, forms no part of the present invention, mounted on the tripod 38 and engaged with the threads 44 formed in the foot of the retainer unit attachment to hold the casing 14 in any desired position.

When the gripping device for rotating the drum 18, 20 is made in the form of a shoe receptacle 30 it can accommodate the mounting of a foot 37 of a photographic flash light thereon as shown in FIG. 2.

It can readily be seen from viewing FIG. 2 of the drawing that the improved attachment element 10 shown therein allows the casing 14 and its associated shoe 30 which supports the previously mentioned photo flashlight unit 36; to be rotated as a unit in a horizontal plane about a vertical axis of the tripod 38 this construction also allows the handle 56 to tilt the attachment element 10 to a desired position where the light sensor 46 can be aimed at any desired object e.g., a master photographic flash light unit, not shown so that the flashlight unit 36 can be fired in a conventional manner and in synchronism with the master flashlight unit. The improved attachment 10 also shows the photographic flash light unit 36 to be rotated in a horizontal plane about the vertical axis of the tripod 38 for aiming at any photographic object while the sensor 46 of the triggering unit of casing 14 is aimed in a different direction at the previously mentioned master flash unit.

The embodiments of the invention in which an exclusive privilege or property is claimed are defined as follows.

1. An attachment element including a housing for on a support member, comprising a rotatable shaft and a sleeve that encompasses said shaft, said shaft and sleeve being positioned within said housing and mounted for joint frictional rotational movement on said housing, said sleeve being in spaced apart relationship with said shaft, the side of said sleeve and said housing having walls that form openings therein, a resilient band in the form of an elongated closed loop, a first portion of said loop being positioned in loose captured relationship between the outer wall of said shaft and the inner wall of said sleeve, portions of said loop that extend away from said first portion forming two adjacent folded portions thereof, said folded portions being positioned to extend through and beyond said openings in said sleeve and said housing to a position whereat said folded portion may be separated to embrace the support member to which the housing is to be attached, a gripping means connected to at least one end of said shaft and positioned immediately adjacent the exterior of said housing, said rotation of said gripping means in one direction being operable to wind a portion of said loop that extends away from its said first portion in folded form about the outside surface of said sleeve and to thereby simultaneously effect the pulling of said housing into snug mounted engagement against said support member, said gripping means being further operable to rotate said shaft and sleeve in an opposite direction to unwind said folded band portions from said sleeve to a position in which said band is in a loose, readily removable position about said support.

* * * * *